United States Patent Office 2,731,483
Patented Jan. 17, 1956

2,731,483

PROCESS FOR THE PRODUCTION OF ZINC FORMALDEHYDE SULPHOXYLATE FROM BASIC ZINC FORMALDEHYDE SULPHOXYLATE

Alfons Janson, Ludwigshafen (Rhine) Oppau, Germany, assignor to Badische Anilin- & Soda-Fabrik Aktiengesellschaft, Ludwigshafen (Rhine), Germany No Drawing. Application November 2, 1951, Serial No. 254,635

Claims priority, application Germany November 7, 1950

3 Claims. (Cl. 260—429)

This invention relates to a process for the production of the zinc formaldehyde sulphoxylate from the basic zinc formaldehyde sulphoxylate.

For the production of the readily watersoluble zinc formaldehyde sulphoxylate which is an important dye assistant, it has already been proposed for example to react zinc hyposulfite solutions with formaldehyde whereby the readily soluble compounds of the formulae

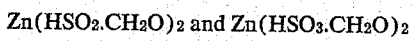

$Zn(HSO_2.CH_2O)_2$ and $Zn(HSO_3.CH_2O)_2$ are obtained. Since the zinc formaldehyde sulphoxylate $Zn(HSO_2.CH_2O)_2$ is somewhat more difficultly soluble than the zinc formaldehyde bisulfite $Zn(HSO_3.CH_2O)_2$, the former can be obtained by partial evaporation of the solution. The zinc formaldehyde bisulfite remaining in the mother liquor can be reduced with zinc dust to the basic zinc formaldehyde sulphoxylate which, however, is difficultly watersoluble. This salt may be reacted with acids to form the readily soluble zinc formaldehyde sulphoxylate. If for this purpose there are employed acids of which the zinc salts are readily soluble in water, such as hydrochloric or sulfuric acid, a separation of these salts from the zinc formaldehyde sulphoxylate can only be effected with difficulty. In order to obviate these difficulties, the reaction has been carried out with carbon dioxide (carbonic acid) under increased pressure, for example under a pressure between 10 and 60 atmospheres, if desired with an addition of ammonia or amines, whereby, besides the zinc formaldehyde sulphoxylate, zinc carbonate is obtained. Besides the advantages of this process, it has the drawback that, apart from the fact that the process is rendered more difficult by the use of increased pressure, pure products are not obtained when employing ammonia or amines, but condensation products of the zinc formaldehyde sulphoxylate with ammonia or the amines used.

I have now found that the employment of pressure or the addition of ammonia or amines is not necessary when the reaction of the basic zinc formaldehyde sulphoxylate is carried out with sulfurous acid. The products of the reaction,

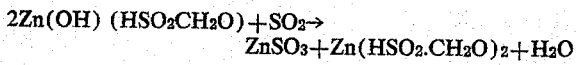

$2Zn(OH)(HSO_2CH_2O) + SO_2 \rightarrow ZnSO_3 + Zn(HSO_2.CH_2O)_2 + H_2O$ are the zinc formaldehyde sulphoxylate and zinc sulfite which is soluble with very great difficulty in water and can therefore be readily separated.

The reaction with sulfurous acid is preferably carried out by leading into an aqueous suspension of the basic zinc formaldehyde sulphoxylate at room temperature, and in any case advantageously not above 25° C., such an amount of sulfur dioxide while stirring vigorously that the reducing power of the clear filtered solution no longer increases.

The separated zinc sulfite may for example be converted by means of formaldehyde into its formaldehyde compound and the latter reduced with zinc dust, or it may be converted into zinc bisulfite and the latter reduced with zinc dust to zinc hyposulfite. The zinc bisulfite may also be used as a buffer substance in the preparation of sodium hyposulfite by the amalgam process.

The zinc formaldehyde sulphoxylate may readily be recovered in pure form by evaporating the solution and drying the resulting residue in vacuo.

The following example will further illustrate this invention but the invention is not restricted to this example. The parts are by weight.

Example 33 parts of sulfur dioxide are slowly led into a suspension of 160 parts of the basic zinc formaldehyde sulphoxylate or the equivalent amount of its hydrate in 400 parts of water while stirring vigorously and while keeping the temperature of the liquid below 25° C.

By separating and drying the solids, 71 parts of zinc sulfite are obtained. The solution is evaporatd in vacuo until a pulp is formed. By filtering and drying the solids, 123 parts of the zinc formaldehyde sulphoxylate are abtained. The mother liquor is co-employed in further reactions for the preparation of the suspension to be reacted.

What I claim is:

1. A process for the production of the zinc formaldehyde sulphoxylate from the basic zinc formaldehyde sulphoxylate which comprises acting on said basic salt with such amounts of sulfurous acid that zinc sulfite which precipitates, and the zinc formaldehyde sulphoxylate are formed, separating the precipitated zinc sulfite from the solution and then recovering the said zinc formaldehyde sulphoxylate from the solution.

2. A process for the production of the zinc formaldehyde sulphoxylate from the basic zinc formaldehyde sulphoxylate which comprises acting on said basic salt in aqueous suspension with such amounts of sulfurous acid that zinc sulfite which precipitates, and the zinc formaldehyde sulphoxylate are formed, separating the precipitated zinc sulfite from the solution and then recovering the said zinc formaldehyde sulphoxylate from the solution.

3. A process for the production of the zinc formaldehyde sulphoxylate from the basic zinc formaldehyde sulphoxylate which comprises acting on said basic salt in aqueous suspension at a temperature not exceeding about 25° C. with such amounts of sulfurous acid that zinc sulfite which precipitates, and the zinc formaldehyde sulphoxylate are formed, separating the precipitated zinc sulfite from the solution and then recovering the said zinc formaldehyde sulphoxylate from the solution.

References Cited in the file of this patent

UNITED STATES PATENTS

| | | |
|---|---|---|
| 2,223,886 | Downing | Dec. 3, 1940 |
| 2,282,965 | Hurd | May 12, 1942 |

FOREIGN PATENTS

| | | |
|---|---|---|
| 608,397 | Germany | Jan. 10, 1935 |
| 611,397 | Germany | Mar. 7, 1935 |

OTHER REFERENCES

Handbook of Physics and Chemistry, pages 290–291, 14th edition, Chemical Rubber Publishing Company, Cleveland, Ohio.